Patented Feb. 11, 1930

1,746,464

UNITED STATES PATENT OFFICE

FRANZ FISCHER AND HANS TROPSCH, OF MULHEIM-ON-THE-RUHR, GERMANY

PROCESS FOR THE PRODUCTION OF PARAFFIN-HYDROCARBONS WITH MORE THAN ONE CARBON ATOM

No Drawing. Application filed April 1, 1926, Serial No. 99,163, and in Germany July 21, 1925.

It is generally known that the oxides of carbon can be converted into methane by catalytic reduction (see Sabatier, Die Katalyse in der organischen Chemie, Liepzeg 1914, page 62 and following). The best temperature for attaining this effect differs according to the catalyzer employed. Applicants now have found that, instead of methane, its homologues like ethane, propane and yet higher homologues which are easily liquefiable, liquid or even solid nature, are obtained if the temperature is lowered beyond that which is necessary for the formation of methane, the same catalyzer being employed. The reaction speed which is reduced hereby must then be compensated for by increased activation of the catalytic agent or catalyzer, for instance by utilizing a catalyzer which contains oxygen compounds besides free metals.

Consequently the production of the paraffin-hydrocarbons with more than one carbon atom is carried out according to the present invention by treating the oxides of carbon mixed with hydrogen or hydrogen containing gases catalytically under normal, slightly increased or reduced pressure but at temperatures which are lower than those at which the catalyzer used would normally produce methane alone. From the reaction mixture formed the homologues of the methane which have been obtained are separated from the other constituents in a well known manner known per se, for instance by means of washing oils, adsorption, pressure, cold and the like.

Instead of only lowering the temperature in this process in the manner herewith described, below the temperature which is adapted for the exclusive formation of methane, a higher flowing speed or quicker rate of feed may be employed for the gases to be treated than that suitable for the exclusive formation of methane by the catalytic agent or mixture of catalyzers used, the formation of paraffin hydrocarbons with more than one carbon atom being favored also thereby.

Separating methods which permit of separating benzine vapours from gas-mixtures of the kind in question, for instance with the aid of washing oils, solid adsorption means like silica gel, active carbon and the like, cold, pressure and the like are known per se; in the present case it is only the combination of such methods with the catalytic reduction of oxides of carbon under the conditions stated which is of importance.

Examples (1) When a mixture of carbon oxides and hydrogen containing gases is treated in the presence of a catalyzer consisting of a mixture of zinc-oxide and finely distributed iron at 430° C., then only methane is obtained as the sole hydrocarbon produced. But when the temperature is lowered to 380° C. the obtained hydrocarbons consist of 80% methane and of 20% higher homologues. At 300° C. the proportion is already more than reversed. The hydrocarbons consist in this case of only 10% methane and of 90% paraffin hydrocarbons with more than one carbon atom.

(2) Cobalt in finely distributed state and obtained by reduction from cobalt protoxide (free from nickel) is used as catalyzer. The initial gas had the following composition: 1,2% $CO_2$, 0,1% $O_2$, 71,9% $CO$, 22,8% $H_2$, 4,0% $N_2$. At 400° and at 350° C. only methane was obtained as hydrocarbon. When the temperature is lowered to 310° C. the formation of higher homologues begins which partly separate in the liquid state, whereas an other part is obtained in the form of gas. The latter portion consists of about 67 by vol. % methane and 33 vol. % of its homologues. At 270° C. the formation of the liquid hydrocarbons increases and also the gas then contains only higher homologues of methane but no traceable quantities of methane.

(3) The same catalyzer as in Example No. 2 was used. The initial gas consisted of 1,7% $CO_2$, 44,0% $CO$, 50,1% $H_2$ 4,2% $N_2$. At 400° C. and at 350° only methane was formed as hydrocarbon, at 300° C. liquid hydrocarbons appeared; but the hydrocarbons in the gas consisted still of 50 vol. % of methane. At 250° C. only higher homologues could be obtained.

(4) A catalyzer, containing equal parts of elementary iron and copper, produced for instance by mixing of equivalent quantities of nitrate of iron and nitrate of copper, converting the said nitrates into oxides and reducing the said oxides to metal, yields at temperatures above 400° C., if water gas is conducted over the same, at normal pressure methane as the only hydrocarbon. When the temperature is lowered below 400° C. higher homologues can be observed in the reaction mixture, at 350° C. considerable quantities of the same are produced, at 300° C. liquid hydrocarbons are separated directly, whereas the gas still contains methane. At 250° C. the gas is free of methane and only higher homologues of essentially liquid nature are obtained.

(5) If about 2% of potassium carbonate is added to the catalyzer according to Example No. 4 an even stronger condensation to larger hydrocarbon molecules occurs. At temperatures above 400° C. again methane is the only hydrocarbon formed, but if the temperature is lowered to 270° C. there is not only no trace of methane to be observed in the gas, but even the quantity of gaseous homologues has considerably decreased and solid reaction products possessing the character of paraffin appear, which solidify instantly on the cooler portions of the reaction tube.

(6) A gas consisting of 1 part by volume of carbonic oxide and 2 parts by volume of hydrogen was conducted at 270° C. over a catalyzer consisting of a mixture of metallic cobalt and zinc-oxide. The reaction gas contained 24,2% by volume of hydrocarbons, besides carbonic acid, hydrogen and small quantities of nitrogen. The composition of the hydrocarbons formed was in per cents by weight: 30,7 methane, 16,2 ethane, 23,5 propane, 14,1 butane, 14,1 pentane.

(7) When purified water gas is passed at 340° C. and with a flowing speed of about 5 liters per hour over a contact material prepared from nitrate of cobalt and chromic oxide by reduction at 350° C., hydrocarbons are obtained in which the proportion of methane to its higher homologues is 1:0. In other words no higher homologues but only methane is formed under these conditions. At 290° C. the corresponding proportion by weight is 2:1; at 270°C. it is 1:3. The weight of the homologues in this latter case therefore is already thrice that of the methane.

An example which shows the favorable influence of the flowing speed is the following:

If at 290° C., under the conditions mentioned, at which the proportion of methane to its homologues is 2:1 the flowing speed is increased to fourfold, the obtained proportion of methane and its homologues is inversed and therefore now is 1:2.

The reaction gases obtained are made to pass through active carbon or washed with oil, whereupon the absorbed benzine-like hydrocarbons are blown off by means of steam. The benzines are thus obtained in a liquid state whereas they were previously present in the gas for the largest part in the state of vapour. Occasionally a portion of the homologues of the methane separates directly in liquid or even in solid state, but there are always higher hydrocarbons present also in the gas and can be separated only by the application of the typical isolating methods known.

The examples given can easily be multiplied as well for the utilization of simple as for combined catalyzers, as far as such catalyzers are adapted at all for the reduction of carbonic oxide or carbonic acid. From the examples given it can be seen that the conditions for the appearance of the higher homologues of methane are essentially based in the lowering of the temperature below the methane-optimum for the formation of methane. Not only combined catalytic agents but also simple metallic catalyzers, not only gas mixtures rich in hydrogen but also gas mixtures rich in oxide of carbon give the same result. The actual optimum for the formation of the higher homologues must be ascertained by experiments. But always it is essential that the temperature for obtaining the higher homologues be lower than that for the exclusive formation of methane so that, by the present invention, the way is shown for all catalytic agents in question how to produce the higher homologues of the methane. An exception is only given for those catalyzers which also at lower temperatures essentially cause only the formation of methane as long as the catalytic reaction takes place at all. This is the case especially for pure nickel.

The technical importance of the present invention consists in that the way has been found to synthesize higher hydrocarbons than methane from the oxides of carbon without the application of such high pressures as were necessary according to known methods. A pressure of a few atmospheres or atmospheric pressure or even reduced pressure are quite sufficient for the purpose of the present process.

Having now particularly described and ascertained the nature of our said invention, what we claim is:

1. A process for obtaining paraffin-hydrocarbons with more than one carbon atom from oxides of carbon by first treating oxide of carbon mixed with hydrogen-containing gases in the presence of catalytic agents suitable for forming methane from such gases, at a pressure not considerably exceeding the atmospheric pressure and at an elevated temperature below that at which methane would normally be exclusively formed with the use of the same gases and the same catalytic agents, and by thereafter separating the formed higher homologues of the methane from the other constituents of the reaction mixture; the use of nickel as catalyzer being excluded.

2. A process for obtaining paraffin-hydrocarbons with more than one carbon atom from oxides of carbon by first heating oxides of carbon mixed with hydrogen-containing gases in the presence of catalytic agents suitable for forming methane from such gases, at a pressure not considerably exceeding the atmospheric pressure and at a temperature below that at which methane exclusively would normally be formed, at the same time increasing the rate of feed of the reacting gases, and by thereafter separating the formed higher homologues of the methane from the other constituents of the reaction mixture; the use of nickel as catalyzer being excluded.

3. A process for obtaining paraffin-hydrocarbons with more than one carbon atom from oxides of carbon by heating oxides of carbon mixed with hydrogen-containing gases at a pressure not exceeding four atmospheres in the presence of such a metallic catalyzer which is suitable for forming methane from said gases but at a temperature below that at which methane would normally be formed as the chief reaction product by the use of said gases and said catalyzer and separating the higher homologues of methane formed from the other reaction products; the use of nickel as catalyzer being excluded.

4. A process for obtaining paraffin-hydrocarbons with more than one carbon atom from oxides of carbon by heating oxides of carbon with hydrogen-containing gases at a pressure not exceeding four atmospheres in the presence of such a metallic catalyzer which is suitable for forming methane from said gases at a temperature below that at which methane would normally be produced as the principal reaction product, increasing the rate of feed of the gases employed over that employed where methane is the principal reaction product, and by thereafter separating the formed higher homologues of the methane from the other constituents of the reaction mixture; the use of nickel as catalyzer being excluded.

5. A process for obtaining paraffin-hydrocarbons with more than one carbon atom from oxides of carbon by heating oxides of carbon with hydrogen containing gases at a pressure not exceeding four atmospheres in the presence of catalytic agents which are suitable for forming methane from such gases, at a temperature lower than that at which methane is the chief reaction product, the rate of feed for the gases employed being increased over that employed for the production of methane and separating the higher homologues of methane produced from the other constituents of the reaction mixture; the use of nickel as catalyzer being excluded.

6. A process for obtaining paraffin-hydrocarbons with more than one carbon atom from oxides of carbon by heating oxides of carbon mixed with hydrogen-containing gases in the presence of catalytic agents which are suitable for forming methane from such gases, under normal pressure but at a temperature less than that employed where methane is produced as the chief reaction product with the employment of the same gases and catalysts, and by thereafter separating the formed higher homologues of the methane from the other constituents of the reaction mixture; the use of nickel as catalyzer being excluded.

7. A process for obtaining paraffin-hydrocarbons with more than one carbon atom from oxides of carbon by heating oxides of carbon mixed with hydrogen-containing gases in the presence of catalytic agents which are suitable for forming methane from such gases, under normal pressure but at a temperature less than that employed where methane is produced as the chief reaction product with the employment of the same gases and catalysts but at a higher temperature and at a slower rate of feed for the gases employed, and by hereafter separating the formed higher homologues of the methane from the other constituents of the reaction mixture; the use of nickel as catalyzer being excluded.

8. A process for obtaining paraffin-hydrocarbons with more than one carbon atom from oxides of carbon by first treating oxide of carbon mixed with hydrogen containing gases in the presence of catalyzers containing metals of the iron group of the periodic system at a pressure not considerably exceeding the atmospheric pressure and at an elevated temperature below that at which methane would normally be exclusively formed with the use of the same gases and the same catalytic agents, and by hereafter separating the formed higher homologues of the methane from the other constituents of the reaction mixture; the use of nickel as catalyzer being excluded.

9. A process for obtaining paraffin-hydrocarbons with more than one carbon atom from oxides of carbon by heating oxides of carbon mixed with hydrogen containing gases in the presence of catalyzers containing metals of the iron group of the periodic system under normal pressure but at a temperature less than that employed where methane is produced as the chief reaction product with the employment of the same gases and catalysts, and by thereafter separating the formed higher homologues of the methane from the other constituents of the reaction mixture; the use of nickel as catalyzer being excluded.

In testimony whereof we have hereunto set our hands.

PROFESSOR DR. FRANZ FISCHER.
DR. ENGINEER HANS TROPSCH.